United States Patent [19]

Seiver

[11] Patent Number: 5,415,520
[45] Date of Patent: May 16, 1995

[54] APPARATUS FOR LOADING DRUMS ON PALLETS

[76] Inventor: Michael J. Seiver, 3002 Shadowdale, Houston, Tex. 77043

[21] Appl. No.: 208,358

[22] Filed: Mar. 10, 1994

Related U.S. Application Data

[63] Continuation of Ser. No. 936,013, Aug. 27, 1992, abandoned.

[51] Int. Cl.⁶ .............................................. B65G 57/00
[52] U.S. Cl. ................................. 414/799; 414/927
[58] Field of Search ............... 414/622, 626, 661, 230, 414/799, 922, 927; 294/88

[56] References Cited

U.S. PATENT DOCUMENTS

| | | | |
|---|---|---|---|
| 2,614,711 | 10/1952 | Houser | 414/622 |
| 2,827,184 | 3/1958 | Mueller | 414/622 |
| 3,175,719 | 3/1965 | Herndon | 414/619 |
| 3,402,831 | 9/1968 | Coombe | 414/799 |
| 3,831,782 | 8/1974 | Werntz | 414/927 X |
| 3,863,776 | 2/1975 | Harman | 414/799 |
| 4,197,046 | 4/1980 | Shank | 414/799 |
| 4,540,325 | 9/1985 | Heisler | 414/927 X |
| 4,632,633 | 12/1986 | Avey | 414/799 X |
| 4,764,074 | 8/1988 | Postigo | 414/927 X |

Primary Examiner—Michael S. Huppert
Assistant Examiner—Stephen Gordon
Attorney, Agent, or Firm—Bill B. Berryhill

[57] ABSTRACT

Apparatus for loading drums onto pallets including a support frame having a first area where the drums are moved to predetermined loading positions and a second area where drums may be placed on pallets for further handling. The frame supports a carriage assembly which supports a lift assembly. The lift assembly is engageable with the drums in the predetermined loading positions to lift them for transfer to the second area by the carriage assembly where they are lowered by the lift assembly onto pallets for further handling.

13 Claims, 4 Drawing Sheets

APPARATUS FOR LOADING DRUMS ON PALLETS

CROSS-REFERENCE TO RELATED APPLICATION

The present application is a continuation of U.S. patent application Ser. No. 07/936,013, filed Aug. 27, 1992, and now abandoned.

BACKGROUND OF THE INVENTION

1. Field of the Invention

The present invention pertains to apparatus for loading drums or barrels, empty or loaded with product, onto pallets for further handling. More specifically, the present invention pertains to apparatus for engaging and lifting one or more drums from a predetermined loading position and transferring and lowering he drums onto pallets for further handling.

2. Description of the Prior Art

Many products are placed in drums or barrels for shipment or use. For ease of handling, such drums, empty or filled, are typically placed in multiples, e.g. four drums, in upright positions on a pallet made of wood or other suitable material. As such, the drums are more easily handled, with forklifts or the like, and shipped by truck, train, ship, etc. A number of automatic or semi-automatic drum pelletizing devices have been developed for this purpose.

In most drum pelletizing apparatus of the prior art, individual drums are carried by a conveyor to some predetermined loading position at or near the drum pelletizing apparatus. The drums are then engaged in some manner, individually, in pairs, or other multiples, and lifted or pushed from the predetermined loading position onto an empty pallet which has been positioned to receive them. After the pallet is loaded, the pallet and drums loaded thereon are transferred, perhaps by another conveyor, to another area for further handling. Several pelletizing devices are disclosed in U.S. Pat. Nos. 3,402,831; 3,831,782 and 4,632,633.

In some of these prior art devices, the drums are placed in a tilted, off-center position and then tilted upright onto a pallet. In at least one other, a grappling device is provided for engaging the upper rim of a drum or barrel for lifting the drum and transferring it onto a pallet. If a drum is not completely lifted, it must be tilted, rolled or shoved across a pallet to its ultimate loading position. In doing so, pallets and drums are frequently damaged. In fact, a drum may be penetrated causing its contents to spill. In other devices in which the drums are completely lifted before transfer to a pallet, such as the previously mentioned grappling device, loads may be so concentrated as to cause damage and possible spillage of drum contents. %n any of these cases, automatic operation will be interrupted for clean up and/or repair. In the case of hazardous materials, personnel and environment may be subjected to inherent dangers. Furthermore, certain types of drums, such as plastic or wood, may not be suitable for lifting by some of the drum palletizers of the prior art.

While there are a number of palletizer designs, many have inherent problems. Others have been designed for very specific purposes. Improvements continue to be sought.

SUMMARY OF THE PRESENT INVENTION

The present invention provides apparatus for loading drums onto prepositioned pallets. The apparatus includes a support frame having an area where one or more drums may be moved to a predetermined loading position and another area for receiving a prepositioned pallet on which the drums may be placed for further handling. A carriage assembly is supported on the support frame and is moveable thereon for transferring the drums from the predetermined loading position to the pallet.

A lift assembly is carried by the carriage assembly and is engageable with the drums for lifting them from their pre-determined loading positions and lowering onto the pallet after being transferred to the pallet on the carriage assembly. The lift assembly includes upper and lower gripping elements which are moveable between non-engaging, spaced apart positions and engaging, less spaced apart positions in which the upper and lower gripping elements engage the upper and lower ends, respectively, of the drums. In one embodiment of the invention, the lower gripping elements are uniquely attached to a pivotally mounted arm for arcuate movement between a non-engageable position, away from the lower drum end, and an engageable position, beneath the lower drum end. In this unique embodiment, at least one inflatable and deflatable device is provided, inflation of which moves the arm and lower gripping element to one of the non-engageable and engageable positions and deflation of which permits movement to the other position.

With the apparatus of the present invention, the drums are uniquely engaged by gripping elements which permit lifting, transfer and lowering of the drums onto a pallet without damage thereto. No rolling, tilting, pushing or other handling of the drums is required, resulting in almost no chance of damage to the drums or the pallets on which they are placed. The apparatus is especially suitable for automatic assembly line type operation. Many other objects and advantages of the invention will be apparent from reading the description which follows in conjunction with the accompanying drawings.

DESCRIPTION OF THE PREFERRED EMBODIMENT

Figure 1:
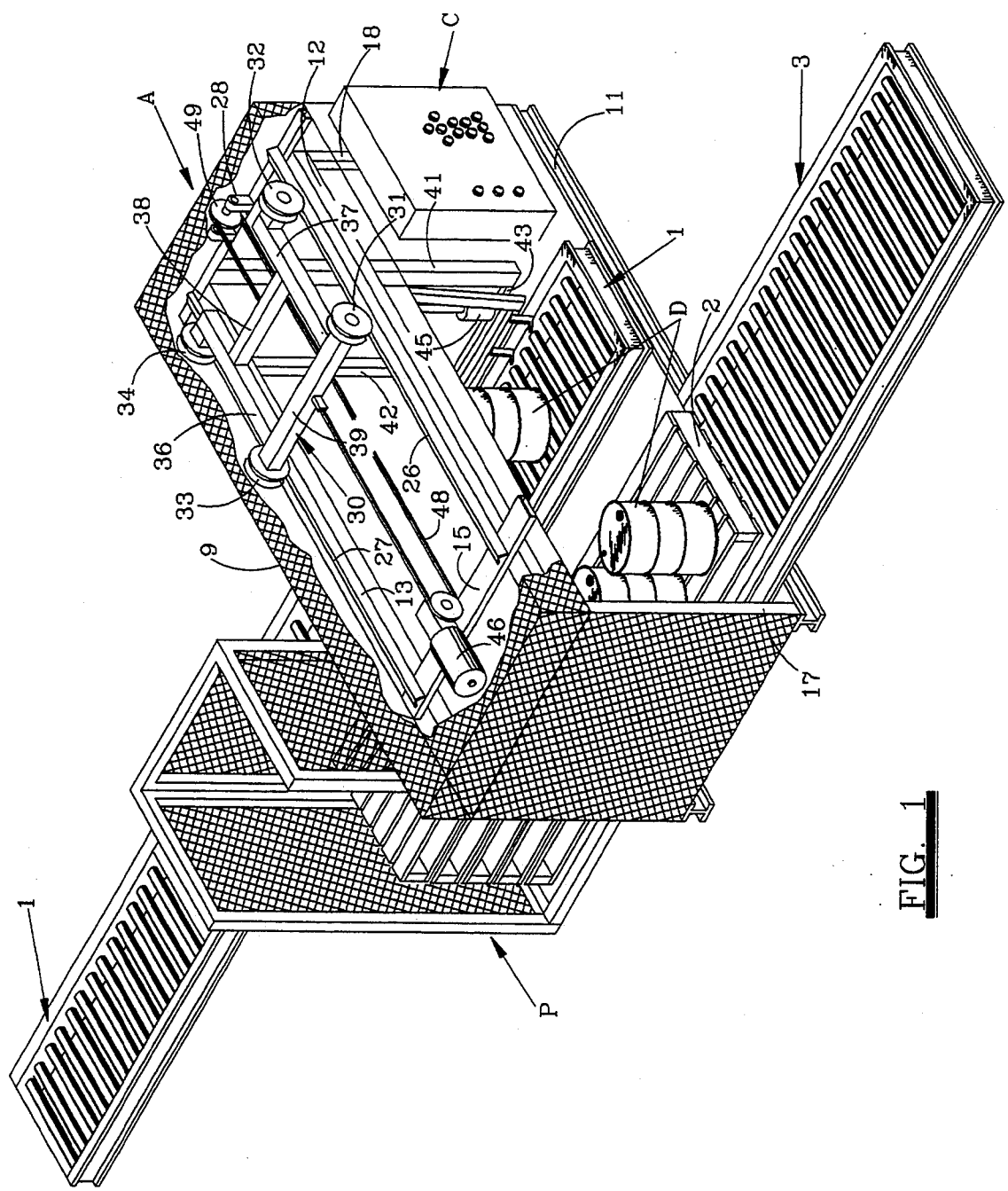
FIG. 1 is a pictoral representation of drum loading apparatus, according to a preferred embodiment of the invention, illustrating drums being received from a conveyor and transferred, in pairs, onto a pallet for further handling.
Figure 2:
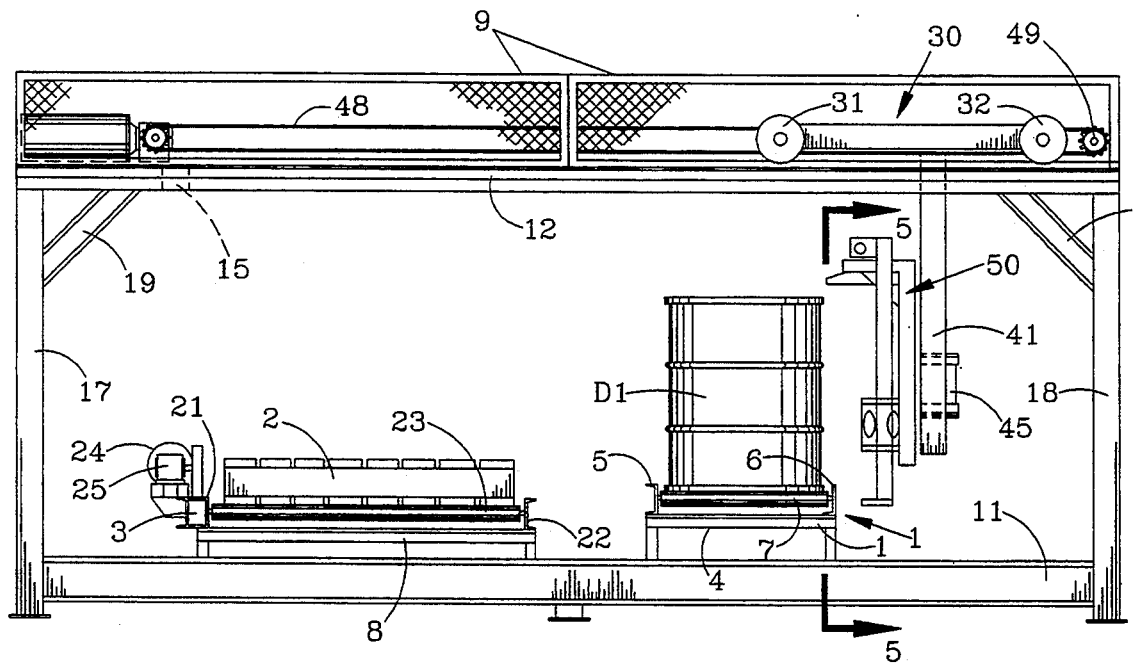
FIG. 2 is an elevation view, partially in section, of the drum loading apparatus of the present invention, according to a preferred embodiment thereof.

Referring first to FIG. 1 there is shown drum loading apparatus A which is associated with a first conveyor 1 by which single drums or barrels D are transported to the apparatus A for movement to a predetermined loading position as illustrated by drum D1 in FIG. 2, for transfer onto pallets, such as the wooden pallet 2, supported in a receiving position on a second conveyor assembly 3. An automatic pallet dispenser P may rest adjacent to the drum loading apparatus A. Such dispensers, known in the prior art, store a stack of pallets and dispense them, one at a time, to the receiving position of pallet 2, as shown in FIGS. 1 and 2.

Figure 3:
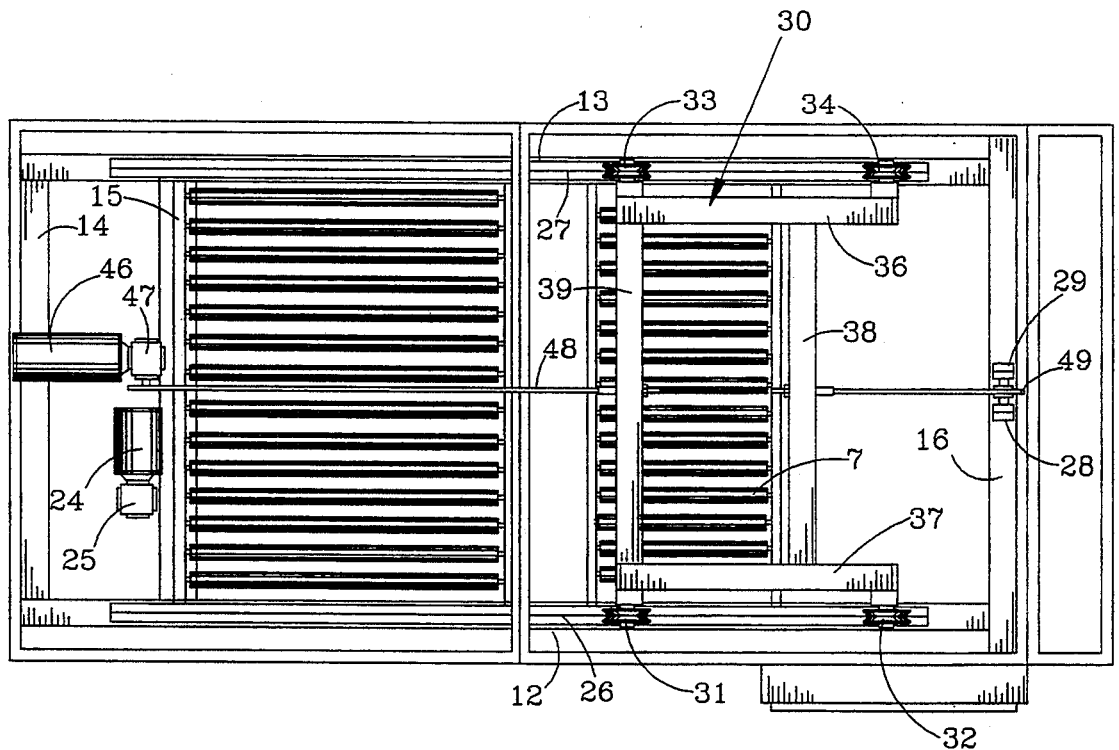
FIG. 3 is a plan view of the drum loading apparatus of FIG. 2.

Referring also now to FIGS. 2 and 3, the drum loading apparatus A is made up of several sub-assemblies including: a support frame 10, carriage assembly 30, lift assembly 50, controls C and various electrical, pneumatic and electropneumatic devices and controls. As shown, the support frame 10 is made up of a number of horizontal and vertical support members 11, 12, 13, 14, 15, 16, 17, 18, angular reinforcement members 19, 20, etc. to provide a rectangular box type support frame 10. The lower pair of horizontal supports 11 support a terminal end of the first conveyor 1 and another terminal end of the second conveyor 3. As illustrated in FIG. 2, the conveyor 1 sits on a base 4 which supports side rails 5 and 6 of the conveyor 1, horizontal rollers 7 being perpendicularly disposed at regular intervals therebetween, as is well known in the prior art. The other conveyor 3 is also mounted on a base 8 which supports side rails 21 and 22 between which are disposed at regular intervals, horizontal rollers 23. A motor 24, gear drive 25 and other power transmission elements (not shown) may be provided for rotating the conveyor rollers 23 in a manner known in the prior art. The pallet 2, lift assembly 50 and drums D1 are removed in FIG. 3 for clarity.

Figure 4:
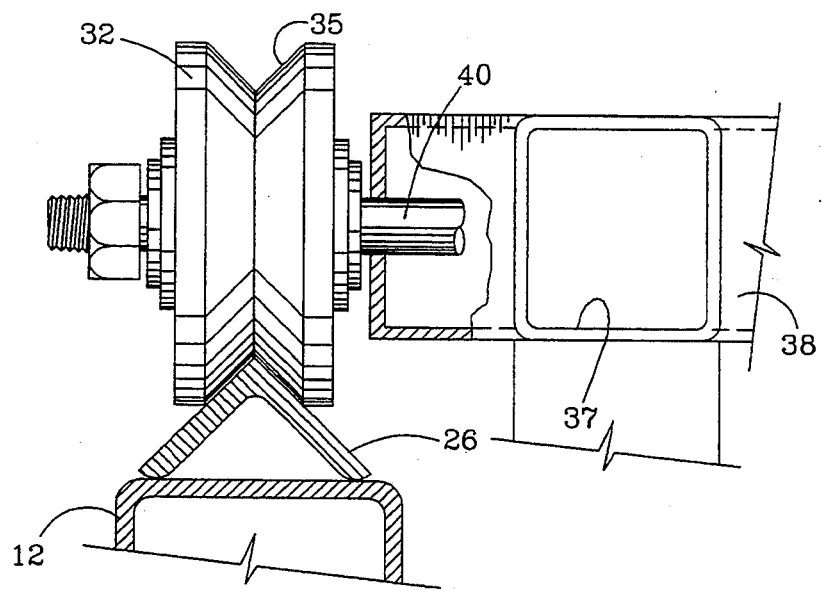
FIG. 4 is a detailed view, partially in section, illustrating the construction of a moving portion of the drum loading apparatus of FIGS. 1, 2 and 3.
Figure 5:
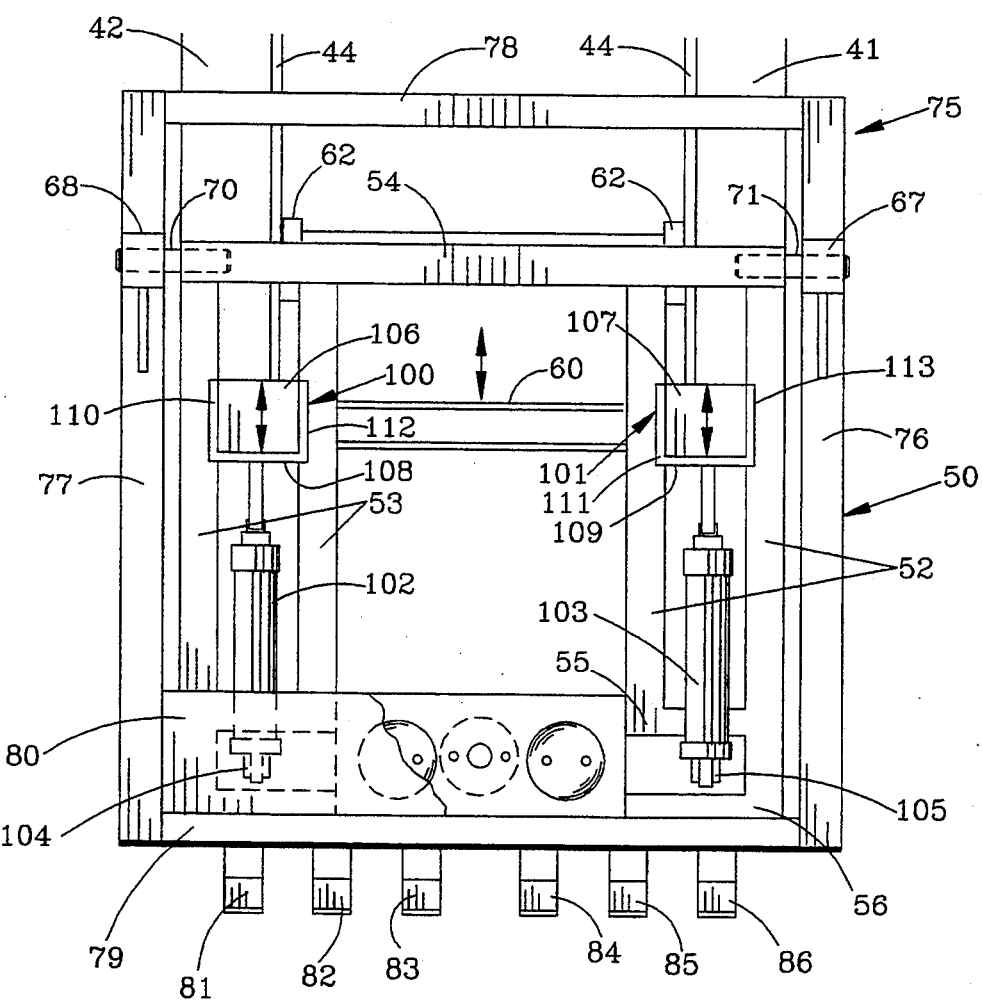
FIG. 5 is a sectional view of a portion of the drum handling apparatus of the present invention, taken along lines 5—5 of FIG. 2.

Surmounted on the frame assembly 10, specifically on the horizontal members 12 and 13 are a pair of rails 26, 27 on which the wheels 31, 32, 33, 34 of the carriage assembly 30 may ride. As best seen in FIG. 4, the rails 26, 27 may be formed of angular members for engagement by frustoconical recesses 35 of the wheels 32, etc. The carriage assembly 30 may include longitudinal members 36, 37 and transverse members 38, 39. The wheels 31-34 are attached to one of these members on an axle represented at 40 in FIG. 4, for rotation about horizontal axes. Depending downwardly from the horizontal members 37 and 38 are a pair of vertical members 41, 42 and a lower horizontal member 43. Mounted on the lower horizontal member 43 (See FIGS. 6 and 7) is a pair of extendable and retractable pneumatic rams 45 which cooperate with the lift assembly 50 to be more fully described hereafter.

As previously mentioned, the carriage assembly 30 is provided with wheels 31-34 which ride on a pair of rails 26, 27 and allow the carriage assembly 30 to move from one end of the frame 10 near the conveyor 1, as shown in FIGS. 2 and 3, to the opposite end of the frame 10 over the conveyor 3. Movement of the carriage assembly 30 is accomplished by a chain 48 which is driven by motor 46 and sprocket drive 47. (See FIGS. 2 and 3). One end of the chain 48 is affixed to the carriage assembly 30 extending around the sprocket of the sprocket drive 47 returning to the other end of the support frame 10, around a sprocket 49 supported thereon by bearings 28 and 29 terminating at the cross-member 38 of the carriage assembly 30. It can thus be easily understood that operation of the motor 46 and rotation of the sprocket drive 47 in one direction will cause the carriage assembly 30 to move from the first area, illustrated in FIGS. 1, 2 and 3, to the second area above pallet 2 and conveyor 3. Rotation in the reverse direction will cause the carriage assembly 30 to be returned from the second area over the conveyor 3 and pallet 2 to the first area illustrated in FIGS. 1, 2 and 3. The upper portion of the carriage assembly 30, including the wheels 31-34, the rails 26, 27, motor 46, sprocket drive 47, chain 48 and sprocket 49, may, for safety and operational purposes, be protected by cages such as the cages 9 represented in FIGS. 1 and 2.

Referring now primarily to FIGS. 2, 5, 6 and 7, the lift assembly 50 will be more fully described. The lift assembly 50 includes a lift frame 51 made up of vertical members 52, 53, horizontal members 54, 55 and 56. The lift frame 50 also includes a sub-frame 60 having vertical members 61 to the outer faces of which are attached linear bearings 62 and 63 which cooperate with linear bearing tracks 44 on the inner surfaces of the vertical members 41, 42 of carriage assembly 30 to permit the entire lift assembly 50 to move vertically upwardly and downwardly in response to extension and retraction of rams 45 which are supported on the horizontal member 43 of the carriage assembly 30. The lower end of the lift frame 51 is provided with horizontally extending supports 57, 58 which support an outer plate 65 spaced from an inner plate 66.

Figure 6:
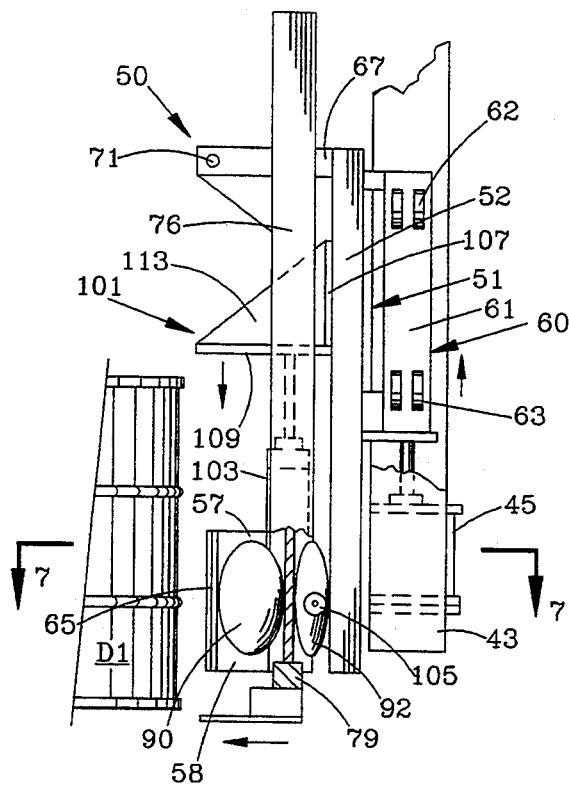
FIG. 6 is a side elevation view, partially in section, of the portion of the drum handling apparatus of the present invention illustrated in FIG. 5 and showing the apparatus in a non-engaging position.
Figure 8:
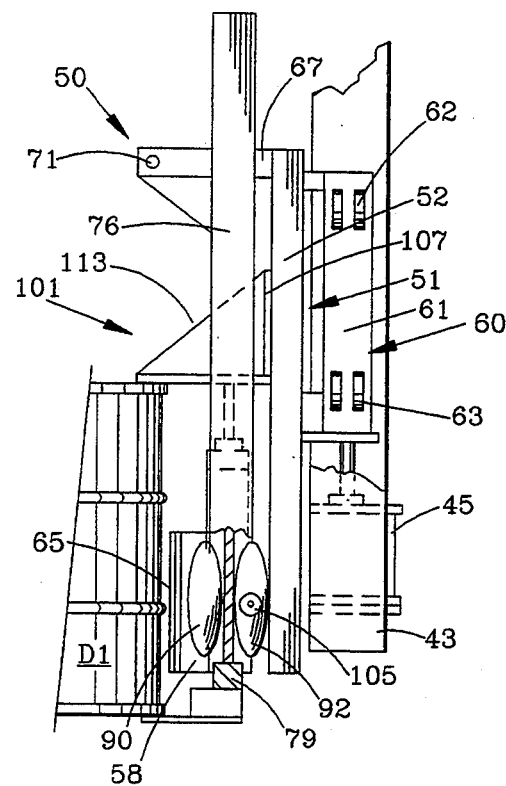
FIG. 8 is a side elevation view, partially in section, of the portion of the drum handling apparatus of the present invention illustrated in FIG. 5 but showing the apparatus in a position engaging and lifting a drum therewith.
Figure 7:
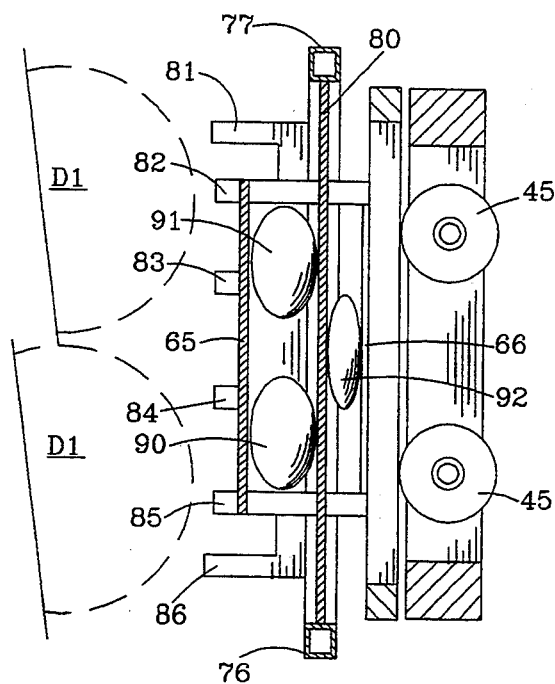
FIG. 7 is a cross-sectional view of the apparatus of FIG. 6, taken along lines 7—7 thereof.
Figure 9:
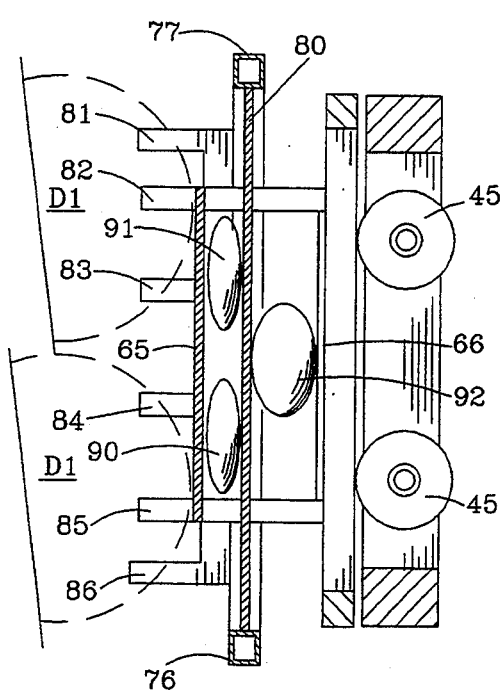
FIG. 9 is a cross-sectional view of the apparatus of FIG. 8, similar to FIG. 7.

Extending from the upper portion of the lift frame 51 are a pair of cantilevered members 67 and 68 which support a pair of coaxially aligned bearings which support corresponding pivot rods 70 and 71 attached to a pivot frame 75. The pivot frame 75 includes a pair of pivot arms 76 and 77 and upper and lower cross-arms 78 and 79. A plate 80 extends between the pivot arms 76 and 77. Attached to the lower cross-arm 79 are a plurality of forks 81-86 which comprise lower gripping elements of a gripping mechanism for gripping a drum such as drums D1. These forks 81-86 are spaced so that they may be inserted, as needed, between the rollers 7 of the conveyor 1. (See FIG. 3). The pivot frame 75 may pivot about the axis of the rods 70 and 71 between a first position away from the lower end of the drum D1, as illustrated in FIGS. 6 and 7, and a second position beneath the lower end of the drum D1 to permit gripping engagement of the drum D1 by the gripping mechanisms of the lift assembly 50. Movement of the pivot frame 75 and the lower gripping elements 81-86 is accomplished by at least one inflatable and deflatable device such as the devices 90, 91, 92 shown in FIGS. 5-9. These devices are sometimes referred to as "air biscuits". If air biscuit 92 is inflated and air biscuits 90, 91 are deflated, the pivot frame 75 pivots about the rods 70, 71 causing the lower gripping elements 81-86 to move from the nonengageable position of FIG. 6 and 7 to an engageable position beneath the drum D1. See FIGS. 8 and 9. Subsequent inflation of air biscuits 90, 91 and deflation of air biscuit 92 will cause the pivot frame 51 and the lower gripping elements 81-86 to return to the nonengageable positions illustrated in FIGS. 6 and 7.

The lift assembly 50 is also provided with upper gripping elements 100 and 101 which are attached to the upper ends of pneumatic rams 102 and 103. The opposite end of the pneumatic rams 102 and 103 are affixed to the lift frame 51 by a clevis connection 104 and 105. Each of the gripping elements 100, 101, includes a vertical plate 106, 107, a horizontal plate 108, 109 and reinforcing gussets 110, 111, 112, 113. The vertical plates 106 and 107 are provided with linear bearing elements (not shown) engageable with corresponding linear bearing elements (not shown) carried on the lift frame 51. The upper gripping elements 100 and 101 move upwardly in response to extension of the rams 102 and 103. Thus the upper and lower gripping elements 100, 101 and 81-86 respectively, are moveable between first non-engaging spaced apart positions and second engaging less spaced apart positions in which the upper and lower gripping elements engage the upper and lower ends respectively, of the drum D1, provided the pivot frame 75 has been moved to a position so that the lower gripping elements 81-86 are beneath the lower end of the drum D1.

All of the valves, pressure regulators and other pneumatic, electrical and electropneumatic components for operating the various electric motors, pneumatic jacks, air biscuits, may be located at the end of the frame 10. These elements are connected by electrical cable, air lines, etc. (not shown) to the respective motors, air jacks, air biscuits, etc. In addition, a control panel (See C in FIG. 1) may be provided to house other control elements including computer hardware and software for automatic operation of the drum loading apparatus of the present invention.

Referring now to all the drawings, sequential operation of the drum loading apparatus of the present invention will be described. It will be assumed that the apparatus is essentially in the position of FIGS. 2 and 3 and that a wooden pallet 2 has just been dispensed from the pallet dispenser P on to the conveyor 3 for receiving drums to be loaded thereon. Drums are being fed along the conveyor 1 to a position adjacent to drum loading apparatus A. The first step is to allow two drums to be fed or carried to a predetermined loading position adjacent the lift assembly 50 as shown in FIG. 2. Next, the pivot frame 51 is pivoted by the inflation of air biscuit 92 and deflation of air biscuits 90, 92 so that the lower gripping elements 81-86 on the lower end of the pivot frame 75 move underneath the two drums D1. See FIG. 9. Then the air jacks 102 and 103 are retracted causing the upper gripping elements 100 and 101 to move toward the upper end of the drums D1. As this occurs, the lift jacks 45 attached to the carriage assembly 30 are extended causing the entire lift assembly 50 to move upwardly. The combination of these motions causes the upper and lower gripping elements to grippingly engage the upper and lower ends of the drums D1, causing them to be lifted from the conveyor 1. See FIG. 8.

After a pair of drums D1 are lifted, the motor 46 is actuated driving the chain 48 and causing the carriage assembly 30 to move on rails 26 and 27 to a position above pallet 2 so that the pair of drums D1 lie to the left hand side of the pallet 2. Next, the lift jacks 45 are retracted lowering the pair of drums onto the pallet 2. As this occurs, the air jacks 102 and 103 are extended, air biscuit 92 is deflated and air biscuits 90, 91 are inflated, swinging the pivot frame 75 back to the upright position and causing disengagement of the upper and lower gripping elements 100, 101 and 81-86, respectively, with the barrels or drums D1. The motor 46 is reversed and the carriage assembly 30 returned to the position illustrated in FIGS. 1, 2 and 3.

This procedure is repeated for two additional drums D1 which are lifted from conveyor 1, moved over the right hand side of the pallet 2 and lowered onto the pallet 2. At this point, four drums D1 rest on the pallet 2. The pallet 2 and the four drums are moved out of the drum loading apparatus A on conveyor 3 for further handling. Another pallet is fed from the pallet dispenser P onto the conveyor 3 and the process continues.

Thus, the drum loading apparatus of the present invention provides an automatic method of loading drums or barrels onto pallets for further handling. The apparatus is fast and efficient. Most importantly, it handles the drums and contents thereof in a manner which assures no damage to the drums and pallets on which they are loaded. Consequently, there is no loss of product and no loss of time and money for repairs due to such damage or spillage of drum contents.

A single embodiment of the invention has been described herein. However, many variations can be made without departing from the spirit of the invention. Accordingly, it is intended that the scope of the invention be limited only by the claims which follow.

I claim:

1. Apparatus for loading drums onto pallets comprising:

support frame means having a first area where one or more drums may be moved to a predetermined loading position and a second area for receiving a pallet on which said one or more drums may be placed for further handling;

carriage means supported by said support frame means and moveable thereon for transferring said one or more drums from said predetermined loading position to said pallet; and lift means carried by said carriage means and engageable with upper and lower portions of said one or more drums for lifting said one or more drums from said predetermined loading position and for lowering said one or more drums, after transfer to said second area for placement on said pallet without sliding said drums across said pallet, said lift means comprising upper and lower gripping means for gripping engagement with said upper and lower portions, respectively, of said one or more drums, at least one of said upper and lower gripping means being attached to gripping power means by which said upper and lower gripping means may be moved between greater spaced apart nonengaging positions and lesser spaced apart engaging positions for said gripping engagement with said upper and lower drum portions, said lower gripping means being moveable between a first position away from said one or more drums and a second position beneath said one or more drums to permit said gripping engagement therewith.

2. Drum loading apparatus as set forth in claim 1 in which said lift means is attached to lift power means by which said lift means and said one or more drums may be vertically lifted from said predetermined loading position and supported on said carriage means for transverse movement from said first area to said second area and by which said lift means and said one or more drums may be lowered for placement on said pallet.

3. Drum loading apparatus as set forth in claim 2 in which said lift power means comprises at least one fluid operated extendable and retractable device, one end of which is attached to said carriage means and the other end of which is attached to said lift means.

4. Drum loading apparatus as set forth in claim 2 in which said support frame means is provided with rail means engageable with wheels provided on said carriage means and by which said carriage means may be transversely moved between said first area and said second area.

5. Drum loading apparatus as set forth in claim 4 including carriage power means connected to said frame means and said carriage means providing power by which said carriage means may be transversely moved between said first and second areas.

6. Drum loading apparatus as set forth in claim 1 in which said lower gripping means comprises one or more fork members, the distal ends of which project outwardly from said lift means for said gripping engagement with said one or more drums and the proximal ends of which are affixed to pivoted arm means, said arm means pivoting about a horizontal axis to effect said movement of said lower gripping means between said first and second positions.

7. Drum loading apparatus as set forth in claim 6 in which said lift means includes arm power means by which said arm means may be pivoted between first and second arcuate positions to move said lower gripping means between said first and second positions.

8. Drum loading apparatus as set forth in claim 7 in which said arm power means comprises at least one inflatable and deflatable device, inflation of which moves said arm means toward one of said first and second arcuate positions and deflation of which permits said arm means to move toward the opposite of said first and second arcuate positions.

9. Drum loading apparatus as set forth in claim 8 including at least one other inflatable and deflatable device, inflation of which moves said arm means toward said opposite of said first and second arcuate positions and deflation of which permits said arm means to move toward said one of said first and second arcuate positions.

10. Drum loading apparatus as set forth in claim 1 including pallet dispensing means adjacent said support frame means in which a plurality of pallets may be stored for sequential placement at said second area for receiving said one or more drums thereon for further handling thereof.

11. Drum loading apparatus as set forth in claim 1 in which said lift means, upon engagement of said one or more drums by said upper and lower gripping means, is vertically moveable on said carriage means for said lifting and for lowering of said one or more drums from said predetermined loading position and on to said pallet, respectively.

12. Drum loading apparatus as set forth in claim 1 in which said lower gripping means is attached to a pivotally mounted arm for arcuate movement between said first and said second positions.

13. Drum loading apparatus as set forth in claim 12 in which said lift means comprises at least one inflatable and deflatable device, inflation of which moves said arm and said lower gripping means to one of said first and said second positions and deflation of which permits movement of said arm and said lower gripping means to the other of said first and said second positions.

* * * * *